United States Patent
Kashnow

[11] 3,914,022
[51] Oct. 21, 1975

[54] QUASI-HOMEOTROPIC TWISTED NEMATIC LIQUID CRYSTAL DEVICE

[75] Inventor: Richard A. Kashnow, Schenectady, N.Y.

[73] Assignee: General Electric Company, Schenectady, N.Y.

[22] Filed: July 2, 1974

[21] Appl. No.: 485,305

[52] U.S. Cl............................. 350/160 LC; 350/150
[51] Int. Cl.² ........................................... G02F 1/13
[58] Field of Search....................... 350/150, 160 LC

[56] References Cited
UNITED STATES PATENTS

| | | | |
|---|---|---|---|
| 3,694,053 | 9/1972 | Kahn.................................. | 350/150 |
| 3,731,986 | 5/1973 | Fergason............................ | 350/150 |
| 3,749,474 | 7/1973 | Cartmell....................... | 350/160 LC |

*Primary Examiner*—Edward S. Bauer
*Attorney, Agent, or Firm*—Daniel R. Levinson; Joseph T. Cohen; Jerome C. Squillaro

[57] ABSTRACT

A liquid crystal device is described comprising a homeotropic, negative dielectric anisotropy, nematic liquid crystal material. The interior surfaces of the bounding substrates are treated to provide a preferred orientation for the liquid crystal molecules in the activated state. The preferred orientation of the substrates is orthogonal to provide a molecular twist in the activated state. Transmissive and reflective embodiments are disclosed.

6 Claims, 4 Drawing Figures

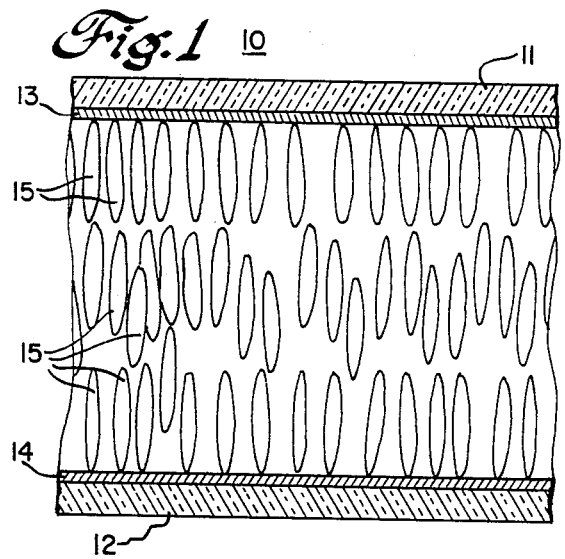
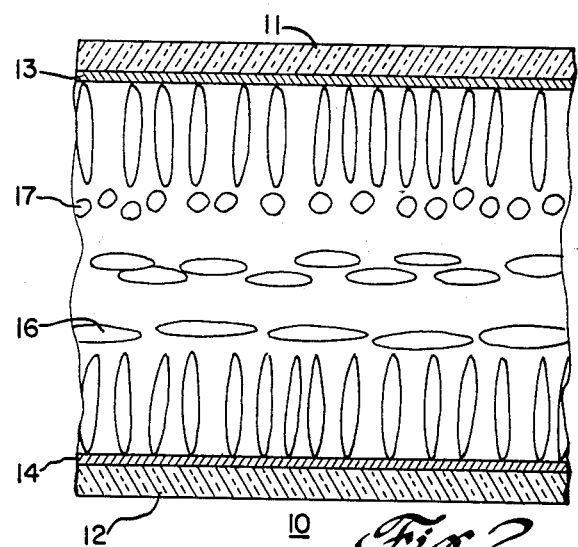
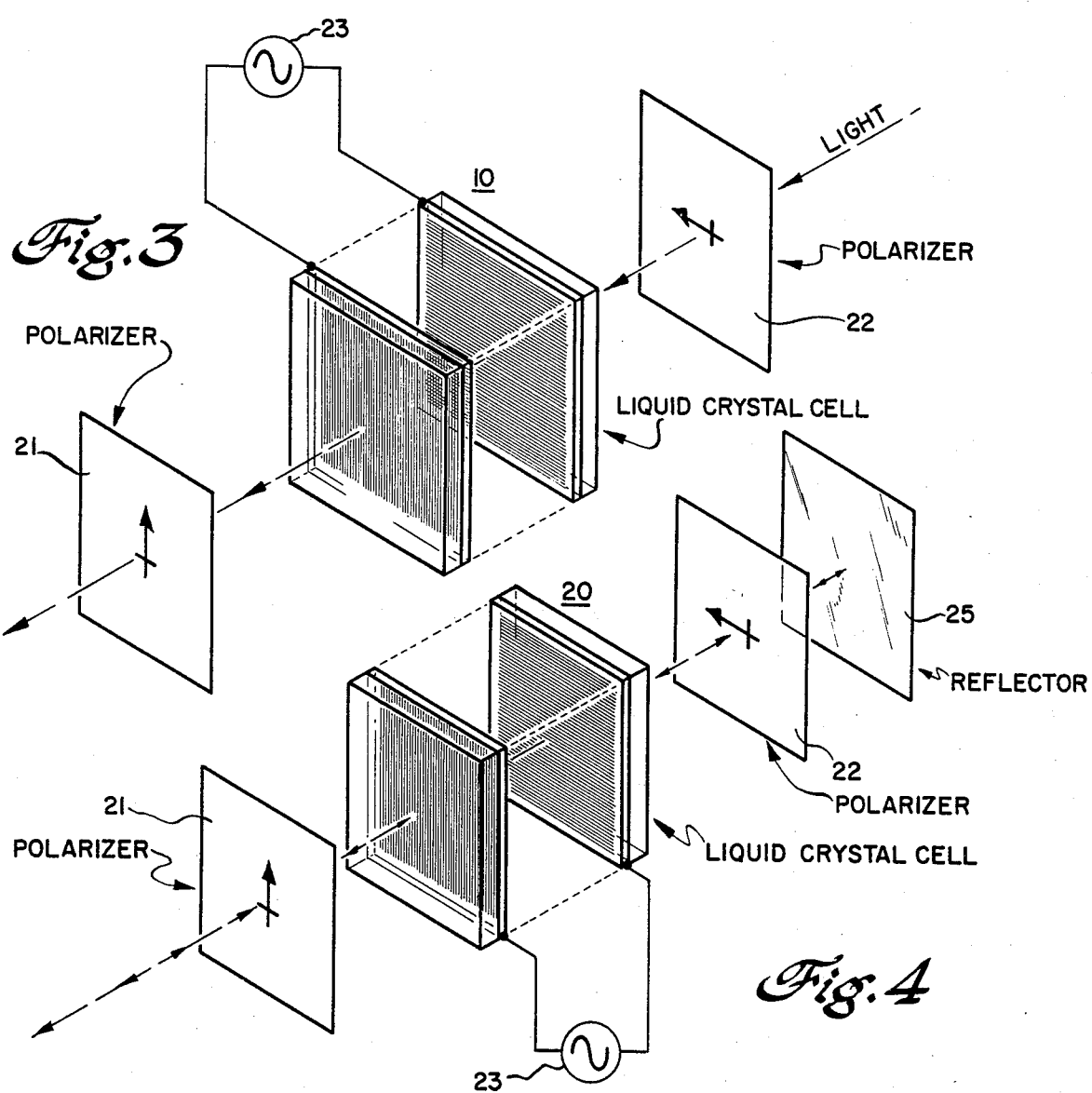

QUASI-HOMEOTROPIC TWISTED NEMATIC LIQUID CRYSTAL DEVICE

This invention relates to liquid crystal devices and, in particular, to a device comprising homeotropic, negative dielectric anisotropy, nematic liquid crystal material.

In the liquid crystal art, numerous devices have been proposed based upon one or another characteristic of the liquid crystal material. One way of categorizing these devices is on the basis of optical function, i.e., transmissive or reflective. An alternative is on the basis of the optical effect, i.e., wave rotation or dynamic scattering. Another alternative is on the basis of apparatus used with the liquid crystal cell itself (boundary forming substrates with liquid crystal material therebetween), e.g., with or without polarizers. Yet another alternative is on the basis of boundary conditions, i.e., homogeneous (parallel) or homeotropic (perpendicular).

In the prior art, polarizers have been used to obtain higher contrast displays than attainable with dynamic scattering devices. However, using polarizers necessitates the use of a wave rotation material. These materials typically comprise single component positive dielectric anisotropy liquid crystals, multi-component mixtures of positive dielectric anisotropy liquid crystals, or mixtures of negative dielectric anisotropy liquid crystals with positive dielectric anisotropy liquid crystals to produce a net positive dielectric anisotropy. Further, the devices utilize homogeneous boundary conditions, i.e., the liquid crystal molecules are induced to align in a preferred orientation parallel to the plane of the boundary surface.

Positive dielectric anisotropy materials generally have a mesophase well above room temperature (20°C). In order to achieve room temperature mesophases, the mixtures noted above are used. However, as is known, liquid crystal materials are often adversely affected by additives in any substantial amount. In the case of positive dielectric anisotropy additives, the viscosity of the mixture is increased, adversely affecting the response time of the device.

In view of the foregoing, it is therefore an object of the present invention to provide an improved contrast liquid crystal display device using negative dielectric anistropy materials.

A further object of the present invention is to provide a liquid crystal display device utilizing polarizers in combination with negative dielectric anistropy materials.

Another object of the present invention is to provide a liquid crystal display utilizing both homeotropic and tilted-homeotropic boundary conditions.

A further object of the present invention is to provide an improved liquid crystal display device comprising negative dielectric anisotropy material.

The foregoing objects are achieved in the present invention wherein in one embodiment, the liquid crystal display device comprises a pair of polarizers on each side of a cell comprising first and second boundary substrates having a nematic liquid crystal therebetween. The interior surfaces of the substrates have transparent electrode coatings and are treated to induce a homogeneous boundary in the quiescent state and a homogeneous bulk distribution of preferred orientation in the active state. The preferred orientation of the surfaces is orthogonal, thereby providing a wave rotating effect in the active state. In the quiescent state, birefringence is minimal due to the homeotropic boundary condition. In general, the device of the present invention transcends many of the categories noted above with respect to the prior art.

A more complete understandiing of the present invention can be obtained by considering the following detailed description in conjunction with the accompanying drawings, in which:

FIG. 1 illustrates a liquid crystal device in the quiescent state in accordance with the present invention.

FIG. 2 illustrates a liquid crystal device in the active state in accordance with the present invention.

FIG. 3 illustrates a transmissive display device utilizing a liquid crystal cell in accordance with the present invention.

FIG. 4 illustrates a reflective display device utilizing a liquid crystal cell in accordance with the present invention.

FIG. 1 illustrates a liquid crystal device in accordance with the present invention in the quiescent state. Specifically, liquid crystal device 10 comprises a first, transparent boundary substrate 11, the interior side of which is covered by a transparent conductive electrode 13 which may, for example, comprise a thin layer of indium oxide or tin oxide. While illustrated as completely covering substrate 11, electrode 13 may be patterned to display the desired information. A second transparent boundary substrate 12 is positioned opposite substrate 11, approximately parallel therewith, and is also covered by a transparent conductive electrode 14, which also may be patterned as desired.

Since the mechanical fabrication of liquid crystal devices is well known in the art, suitable sealing surfaces about the periphery of substrates 11 and 12 are not illustrated. However, with these sealing surfaces in place, a volume is defined between substrates 11 and 12 which is filled with a negative dielectric anisotropy, nematic liquid crystal material, such as MBBA [N-(p-methoxybenzylidene)-p-(n-butyl)aniline]. Liquid crystal materials are typically characterized by an elongated molecule such as molecule 15. In accordance with the present invention, a homeotropic boundary condition is provided so that the elongated molecules, represented by molecule 15, arrange themselves with the long axes thereof approximately perpendicular to substrates 11 and 12. The homeotropic boundary condition is obtained, for example, by the addition of a homeotropic dopant to the negative dielectric anisotropy nematic liquid crystal. Suitable dopants, of the monoplanar type, include lecithin and hexadecyltrimethylammonium sulfate. Typically, 2 percent, or less, by weight of dopant is utilized.

An alternative to the addition of a homeotropic dopant to the liquid crystal material is to deposit an oriented adsorbate by the Blodgett-Langmuir monolayer deposition method in which approximately homeotropic boundary condition is obtained due to optimization of packing densities. The boundary condition is approximately homeotropic in that the molecules have a slight tilt, i.e., less than about 10° from the normal. As used herein, "quasi-homeotropic" includes both perpendicular and tilted molecular alignments.

The adsorbate, which may, for example, comprise hexadecyltrimethyl ammonium bromide, is oriented by the direction of withdrawal of the substrate from the trough. By orienting the adsorbate, a preferred or easy axis is provided that causes the liquid crystal molecules to align themselves parallel to the easy axis in the active state.

Alternatively, an easy axis can be induced by unidirectionally rubbing or grooving the substrates or by the evaporation of a thin film at an oblique angle incident to the substrate. The latter also induces some tilting of the molecules as noted with the Blodgett-Langmuir monolayer deposition. The tilting does not produce a visible effect in the quiescent state. Suitable materials for the thin film include silicon monoxide, platinum, aluminum, and gold.

Any suitable alternative, producing the desired boundary conditions, may be used.

FIG. 2 illustrates the liquid crystal device in accordance with the present invention in the active state in which a suitable excitation voltage is applied to electrodes 13 and 14. This causes the molecules of the nematic liquid crystal to realign themselves, in the bulk, predominantly parallel to the substrates and in a preferred orientation along the easy axes. As illustrated in FIG. 2, the easy axes of the substrates are orthogonal; i.e., molecules, such as molecule 16, align in a direction parallel to the plane of the drawing when adjacent substrate 12 and align, as molecule 17, perpendicularly to the plane of the drawing when adjacent substrate 11. In between, the molecules undergo a twist in preferred direction as one proceeds through the cell from one boundary to the other. Thus, in the active state, a twisted nematic structure is provided which can be used as a wave rotation device for changing the orientation of polarized light.

While illustrated in FIG. 2 as having the easy axes of substrates 11 and 12 orthogonal, it is understood that twists of less than 90° may be utilized.

It will be appreciated by those of skill in the art in considering FIGS. 1 and 2 together that the operation of the liquid crystal device in accordance with the present invention is the opposite of liquid crystal devices of the prior art. Specifically, a homeotropic, rather than a homogeneous, boundary condition is obtained in the quiescent state. Further, the present invention differs from the electro-optical effect known as DAP, an acronym for "Deformation of Aligned Phases," in which an initially homeotropic structure of negative dielectric anisotropy nematic liquid crystal material is deformed by the application of an electric field in order to achieve a voltage modulated phase retardation. The present invention differs from the DAP effect in that the material of the present invention has a twist in the active state which, as discussed below, is utilized to provide wave rotation of polarized light.

FIG. 3 illustrates a preferred embodiment of the present invention when utilized as a light transmissive device. Specifically, liquid crystal cell 10 is interposed between first and second polarizers 21 and 22. The planes of polarization of polarizers 21 and 22 may be orthogonal, as illustrated in FIG. 3, or parallel, depending upon the response desired from the device. Specifically, utilizing crossed polarizers, the device of FIG. 3 appears light in the active state and dark in the quiescent state. Conversely, with parallel polarizers, the device appears dark in the active state and light in the quiescent state.

A source of suitable operating potential is supplied by source 23, which may, for example, produce an alternating current signal which is coupled to conductive layers 13 and 14 on each side of the liquid crystal material.

FIG. 4 illustrates an alternative embodiment of the present invention wherein the device acts as a light reflector. In this embodiment, a reflector is added to reflect the light back through the device to the viewer.

Specifically, the embodiment of FIG. 4 is the same as that of FIG. 3 with the addition of reflector 25. Reflector 25 may comprise a metal film deposited on a separate glass substrate or a metal film deposted on the surface of the rear polarizer.

In the active state, i.e., with a signal applied by source 23, polarizer 21 transmits only the incident light in the plane of polarization thereof to liquid crystal cell 20. Liquid crystal cell 20 rotates the plane of polarization through 90° and transmits it through polarizer 22 to reflector 25. The reflected light is returned through polarizer 22, through cell 20 and exits polarizer 21.

In the quiescent state, liquid crystal cell 20 transmits the light without significant rotation. Since polarizers 21 and 22 are crossed, no light is transmitted by cell 20 for reflection by reflector 25 and the device appears dark. As previously noted, polarizers 21 and 22 may be either parallel or crossed, depending upon the response desired.

There is thus provided by the present invention an improved liquid crystal device utilizing a negative dielectric anisotropy, nematic liquid crystal material in a field effect device, i.e., in a cell used with polarizers. The preferred molecular orientations induced by the opposed substrates are orthogonal while the polarizers are either parallel or crossed, depending upon the nature of the display desired.

Any negative dielectric anisotropy, nematic liquid crystal material can be utilized. It is preferred that the material have relatively high resistivity so that any frequency can be utilized from source 23. As is known in the art, nematic liquid crystal materials are electrohydrodynamically unstable, inducing dynamic scattering, when the applied frequency is less than a critical frequency proportional to the conductivity of the material. For example, relatively pure MBBA [N-(p-methoxybenzylidene)-p-(n-butyl)aniline] has a high resistivity and thus can be used in the present invention with an applied frequency as low as 30 hertz, or lower.

Having thus described the invention, it will be apparent to those of skill in the art that various modifications can be made within the spirit and scope of the present invention. For example, various techniques utilized in fabricating liquid crystal cells may be incorporated into the liquid crystal cell of the present invention. For example, it is known that wider viewing angles are obtainable by making the liquid crystal layer relatively thin, e.g., 8 microns. Other techniques, known in the art, may also be utilized. Further, as previously noted, the easy axes of the substrates may be positioned at other than 90° with respect to each other, i.e., the molecular twist in the active state may be less than 90°. As is apparent to those of skill in the art, the orientation of the polarizers would be suitably adjusted to provide the transmission and absorption characteristics.

What I claim as new and desire to secure by Letters Patent of the United States is:

1. A liquid crystal device comprising:
   a polarizer for polarizing light entering said device;
   an analyzer for analyzing light after passage through said device;

a first boundary substrate;

a second boundary substrate, parallel to and spaced from said first substrate;

said first and second substrates each having transparent electrodes on the interior surfaces thereof;

a negative dielectric anisotropy, nematic liquid crystal material filling the volume defined by said first and second substrates; and said device being contructed such that said liquid crystal material is characterized by a quasi-homeotropic boundary condition in the quiescent state, and a homogeneous twisted nematic bulk molecular arrangement in the active state.

2. The device as set forth in claim 1 and further comprising:

said polarizer and said analyzer are first and second polarizers positioned one adjacent each substrate.

3. The device as set forth in claim 2 wherein the planes of polarization of said polarizers are orthogonal.

4. The device as set forth in claim 2 wherein the planes of polarization of said polarizers are parallel.

5. The device as set forth in claim 2 and further comprising a reflecting surface positioned parallel to and adjacent one of said polarizers.

6. The device as set forth in claim 1 wherein said liquid crystal has a molecular twist of approximately 90° in the active state.

* * * * *